US007058607B1

(12) United States Patent
Miyawaki et al.

(10) Patent No.: US 7,058,607 B1
(45) Date of Patent: Jun. 6, 2006

(54) CONTENTS DISTRIBUTION METHOD AND SYSTEM

(75) Inventors: Tadamitsu Miyawaki, Kawasaki (JP); Toshiki Okiyama, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/388,935

(22) Filed: Sep. 2, 1999

(30) Foreign Application Priority Data

Oct. 21, 1998 (JP) ................................. 10-299759

(51) Int. Cl.
*G06F 17/60* (2006.01)
*H04K 1/00* (2006.01)
*H04L 9/00* (2006.01)

(52) U.S. Cl. ........................... 705/52; 705/50; 705/57; 705/65; 713/159; 713/172; 725/5

(58) Field of Classification Search ............ 705/50–52, 705/57, 65; 713/159, 172; 725/5
See application file for complete search history.

(56) References Cited

U.S. PATENT DOCUMENTS

| 4,736,422 | A | * | 4/1988 | Mason ......................... 380/20 |
| 5,337,357 | A | * | 8/1994 | Chou et al. .................... 380/4 |
| 5,586,186 | A | * | 12/1996 | Yuval et al. .................. 380/30 |
| 5,634,012 | A | * | 5/1997 | Stefik et al. .................. 705/39 |
| 5,646,992 | A | * | 7/1997 | Subler et al. ................. 705/53 |
| 5,727,065 | A | * | 3/1998 | Dillon ......................... 380/49 |
| 5,740,246 | A | * | 4/1998 | Saito ........................... 380/21 |
| 5,764,762 | A | * | 6/1998 | Kazmierczak et al. ......... 380/4 |
| 5,857,020 | A | * | 1/1999 | Peterson, Jr. ................. 380/4 |
| 5,910,987 | A | * | 6/1999 | Ginter et al. ................. 380/24 |
| 5,917,915 | A | * | 6/1999 | Hirose ......................... 380/49 |
| 5,991,876 | A | * | 11/1999 | Johnson et al. ............. 713/200 |
| 5,999,623 | A | * | 12/1999 | Bowman et al. .............. 380/20 |
| 6,000,030 | A | * | 12/1999 | Steinberg et al. ........... 713/200 |
| 6,005,935 | A | * | 12/1999 | Civanlar ........................ 380/4 |
| 6,038,316 | A | * | 3/2000 | Dwork et al. ................ 380/25 |
| 6,069,957 | A | * | 5/2000 | Richards ..................... 380/281 |
| 6,125,184 | A | * | 9/2000 | Dillon et al. ................ 380/44 |
| 6,141,754 | A | * | 10/2000 | Choy .......................... 705/52 |
| 6,144,946 | A | * | 11/2000 | Iwamura ...................... 705/50 |
| 6,226,618 | B1 | * | 5/2001 | Downs et al. ................ 705/51 |
| 6,289,314 | B1 | * | 9/2001 | Matsuzaki et al. ............ 705/51 |

(Continued)

FOREIGN PATENT DOCUMENTS

EP  0676897 A2 * 10/1995

(Continued)

OTHER PUBLICATIONS

O Connor, Mary Ann, "New Distribution Option for Electronic Publishers", CD-ROM Professional, vol. 7, No. 2, pp. 134-135, Mar. 1994.*

(Continued)

*Primary Examiner*—Kambiz Abdi
(74) *Attorney, Agent, or Firm*—Oliff & Berridge, PLC

(57) ABSTRACT

The object of the present invention is to provide contents distribution method and system which can readily distribute digital contents, can prevent unfairness such as copying and falsifying accounting data and can also correspond to the payment of a small amount. To achieve the above object, a distribution service operator encrypts contents provided by a contents provider such as newspaper articles, a magazine, music, images and software and distributes them, a user decodes and utilizes only desired contents using a user terminal that receives the above encrypted contents, accounting is executed for only utilized contents and totalization is carried out by a central station.

7 Claims, 15 Drawing Sheets

U.S. PATENT DOCUMENTS

| | | | |
|---|---|---|---|
| 6,289,455 B1 * | 9/2001 | Kocher et al. | 705/51 |
| 6,343,280 B1 * | 1/2002 | Clark | 705/55 |
| 6,385,596 B1 * | 5/2002 | Wiser et al. | 705/51 |
| 2002/0046174 A1 * | 4/2002 | Sugimori | 705/51 |

FOREIGN PATENT DOCUMENTS

| | | | |
|---|---|---|---|
| JP | A-8-32530 | | 2/1996 |
| WO | WO 90/02382 | * | 3/1990 |

OTHER PUBLICATIONS

Wirbel, Loring, "DirectTV Service Takes to the Air on Time", Electronic Engineering Times, No. 791, Apr. 4, 1994.*

Wiedemer et al, "CD-ROM Versus Online: An Economic Analysis for Publishers", CD-ROM Professional, vol. 8, No. 4, pp. 36-42, Apr. 1995.*

Nathans, Stephen, "The CD/Online Enablers", CD-ROM Professional, vol. 9, No. 3, pp. 46-56, Mar. 1996.*

Rosen, Michele, "IBM Proposes Foundation For Electronic Commerce", MIDRANGE Systems, vol. 9, No. 8, p. 32, May 24, 1996.*

Thyfault, Mary E., "Data From Above", InformationWeek, No. 584, p. 107, Jun. 17, 1996.*

*PolderbitS Sound*, http://www.polderbits.com/recorder_update_uk_htm, Version 1.0, May 23, 1999.

* cited by examiner

FIG. 2
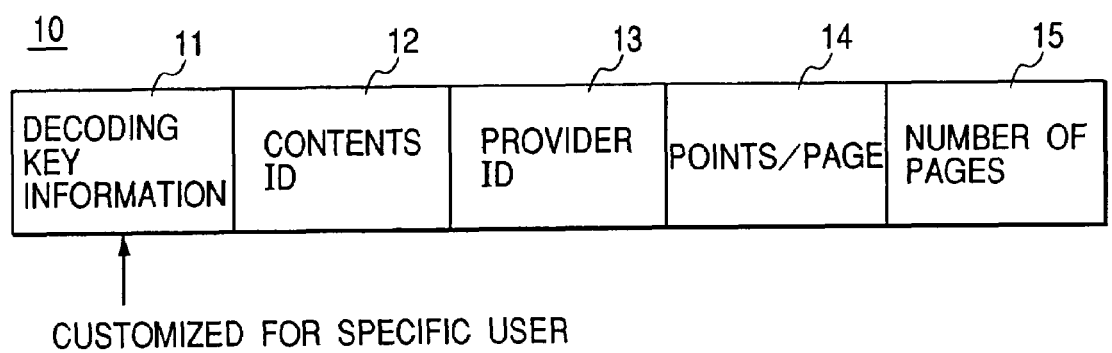
CUSTOMIZED FOR SPECIFIC USER
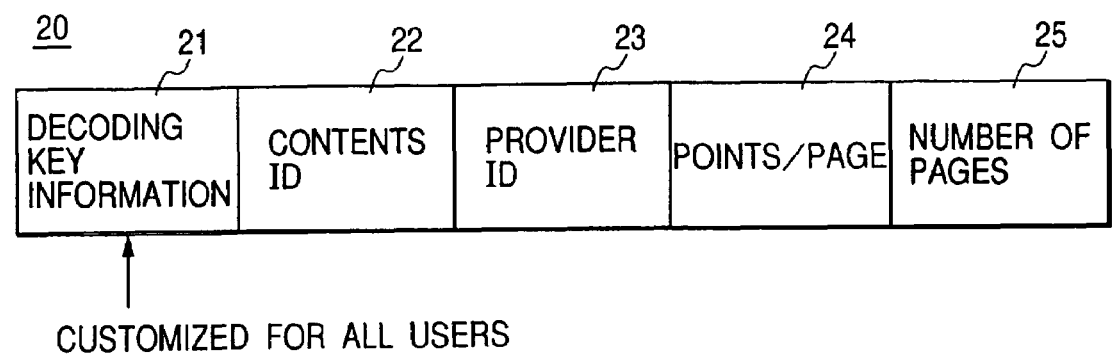
CUSTOMIZED FOR ALL USERS

FIG. 11

| NAME | REMARKS |
|---|---|
| ID | ID USED FOR IDENTIFYING ACCOUNTING AND ISSUED BY ACCOUNTING INFORMATION PROCESSOR |
| CONTENTS ID | ID OF UTILIZED CONTENTS ACQUIRED FROM TICKET |
| PROVIDER ID | ID OF CONTENTS PROVIDER ID ACQUIRED FROM TICKET |
| DATE | DATE OF UTILIZATION ISSUED BY SYSTEM CONTROLLER |
| CONTENTS TOTAL PAGE NUMBER | NUMBER OF PAGES OF CONTENTS REQUESTED TO BE OUTPUT AND ACQUIRED FROM TICKET |
| PRINTED NUMBER | NUMBER OF SHEETS ACTUALLY PRINTED BY PRINTER AND ACQUIRED FROM OUTPUT CONTROLLER |
| NUMBER OF PAGES PRINTED ON ONE SHEET, PAPER SIZE | NUMBER OF PAGES PRINTED ON ONE SHEET AND SIZE/DIRECTION OF PRINTED PAPER RESPECTIVELY ACQUIRED FROM OUTPUT CONTROLLER |
| POINTS/PAGE | NUMBER OF POINTS (OR PRICE) PER PAGE ACQUIRED FROM TICKET |
| USER ID | USER ID ACQUIRED FROM TOKEN |
| TERMINATION STATUS | RESULT OF OUTPUT (ERROR INFORMATION) ACQUIRED FROM SYSTEM CONTROLLER |

FIG. 12

| ID | CONTENTS ID | PROVIDER ID | DATE | CONTENTS TOTAL PAGE NUMBER | PRINTED NUMBER | NUMBER OF PAGES PRINTED ON ONE SHEET, PAPER SIZE | POINTS/PAGE | USER ID | TERMINATION STATUS |
|---|---|---|---|---|---|---|---|---|---|
| 1 | N1 | N | 08/01/1998 | 5 | 3 | 2 PAGES INCREASED | 2 | A | NORMAL TERMINATION |
| 2 | N1 | N | 08/01/1998 | 6 | 3 | 2 PAGES INCREASED | 2 | A | NORMAL TERMINATION |
| 3 | N1 | N | 08/02/1998 | 3 | 1 | 2 PAGES INCREASED | 2 | A | ABNORMAL TERMINATION |
| ... | ... | ... | ... | ... | ... | ... | ... | ... | ... |

| CONTENTS ID | PROVIDER ID | DATE | NUMBER OF USED PAGES | PRICE (¥) |
|---|---|---|---|---|
| N1 | N | 08/01/1998 | 5 | 100 |
| N1 | N | 08/01/1998 | 6 | 120 |
| N1 | N | 08/02/1998 | 2 | 40 |
| ⋮ | ⋮ | ⋮ | ⋮ | ⋮ |

CONTENTS DISTRIBUTION METHOD AND SYSTEM

BACKGROUND OF THE INVENTION

1. Field of the Invention

The present invention relates to contents distribution method and system, particularly relates to contents distribution method and system for enabling encrypting and distributing digital contents and secure accounting.

2. Description of the Related Art

Recently, digital contents such as newspaper articles, a magazine, music, images and software are starting to be distributed utilizing various distribution paths such as the Internet, CD-ROM and satellite communications and in the future, the distribution of digital contents is expected to be further increased. Though many of these digital contents are free, some providers of digital contents desire that in the future, the charge for the distribution of digital contents should be collected.

However, there are generally the following problems for a provider of digital contents to distribute digital contents subject to payment utilizing the above distribution paths and the above problems prevent digital contents subject to payment from being provided.

1) As distributed digital contents are unfairly copied, copyright is not protected.

2) An exact accounting system for digital contents is not established.

3) The amount of the charge for digital contents is small, for example a few tens yen or a few hundreds yen and an accounting system which can correspond to the payment of a small amount is not established.

4) Accounting data may be falsified.

5) Special hardware is required of every terminal utilizing digital contents to be paid and a user utilizing digital contents to be paid is required to considerably invest in facilities.

Therefore, for technique for solving the above problems, "a data broadcast system and a data sink" disclosed in Japanese Published Unexamined Patent Application No. Hei 8-32530 is proposed. In the above "data broadcast system and data sink", a data broadcast system for encrypting and transmitting data, decoding it on the side on which the data is received and flexibly accounting according to the quantity of decoded data and others is disclosed and technique corresponding to the problems described in above 1) and 2) is disclosed.

For a method of paying a small amount described in above 3), many prepaid systems in which a prepaid card is used are proposed.

However, in the above "data broadcast system and data sink" disclosed in Japanese Published Unexamined Patent Application No. Hei 8-32530, there are problems that a key for decoding is required to be prepared every data type and that there is no measure for falsifying accounting data.

In the meantime, in the above prepaid system which is a method of paying a small amount, a receipt for individual digital contents is not issued, purchase is required to be managed on his/her own responsibility and use in an office and others is unsuitable.

SUMMARY OF THE INVENTION

The object of the present invention is provide a contents distribution method and a contents distribution system wherein the distribution of digital contents is facilitated and unfairness such as copying and falsifying accounting data is prevented and which can also correspond to the payment of a small amount.

To achieve the above object, a first invention is based upon a contents distribution method for distributing digitized contents to plural users and is characterized in that contents are encrypted and distributed, a user decodes and utilizes the encrypted contents, and accounting is executed according to the utilized contents.

A second invention is based upon the first invention and is characterized in that in the above distribution, information showing the summary of the above encrypted contents is attached to the encrypted contents.

A third invention is based upon the second invention and is characterized in that only in case the above summary information is accompanied by decoding information for decoding the encrypted contents corresponding to the summary information, the summary information is displayed.

A fourth invention is based upon the first invention and is characterized in that the above decoding is executed based upon a decoding key generated based upon first decoding information attached to the above encrypted contents and second decoding information with which the above user is provided.

A fifth invention is based upon the first invention and is characterized in that the above contents mean a document displayed or printed in page units and the above accounting is executed for the page units.

A sixth invention is based upon the first invention and is characterized in that the above distribution is made by a broadcast.

A seventh invention is based upon a contents distribution system for distributing digitized contents to plural users and is characterized in that a distribution device for distributing encrypted contents, a user terminal for receiving the encrypted contents distributed by the above distribution device and generating accounting information according to the utilization of the encrypted contents received and a central station for collecting and totalizing accounting information generated by the above user terminal are provided.

An eighth invention is based upon the seventh invention and is characterized in that the above distribution device encrypts contents provided by a contents provider, generates encrypted contents, attaches list information showing the contents of the encrypted contents and summary information showing the summary to the above encrypted contents and distributes the above encrypted contents.

A ninth invention is based upon the eighth invention and is characterized in that the above user terminal displays the above list information and the above summary information and decodes only encrypted contents selected by a user based upon the above displayed list information and summary information out of the above received encrypted contents.

A tenth invention is based upon the eighth or ninth invention and is characterized in that the above user terminal displays only list information and summary information respectively corresponding to encrypted contents accompanied by decoding information out of the above list information and the above summary information.

An eleventh invention is based upon the seventh invention and is characterized in that the above distribution device distributes the above encrypted contents by a broadcast.

A twelfth invention is based upon the seventh invention and is characterized in that the above user terminal is provided with a data sink for receiving encrypted contents distributed from the above distribution device, a data output part for storing the encrypted contents received by the above data sink, decoding the encrypted contents stored, and generating accounting information according to the quantity of the decoded contents and a printer for printing the contents decoded by the data output part.

A thirteenth invention is based upon the twelfth invention and is characterized in that the above quantity of the utilized contents means the number of pages included in contents printed by the above printer.

A fourteenth invention is based upon the seventh invention and is characterized in that the above user terminal is provided with a data sink for receiving encrypted contents distributed from the above distribution device and a display for storing the encrypted contents received by the above data sink, decoding and displaying the encrypted contents stored, and generating accounting information according to the number of pages included in the displayed contents.

A fifteenth invention is based upon the seventh invention and is characterized in that the above distribution device distributes the above encrypted contents to which first decoding information required for decoding the encrypted contents is attached and in that the above user terminal decodes the above encrypted contents based upon the above first decoding information and second decoding information intrinsic to a user using the above user terminal.

BRIEF DESCRIPTION OF THE DRAWINGS

FIG. 2 shows the configuration of tickets;

FIG. 11 shows the items of accounting information;

FIG. 12 shows a concrete example of accounting information;

DESCRIPTION OF THE PREFERRED EMBODIMENT

Referring to attached drawings, an embodiment of a contents distribution method and a contents distribution system respectively according to the present invention will be described in detail below.

Figure 1:
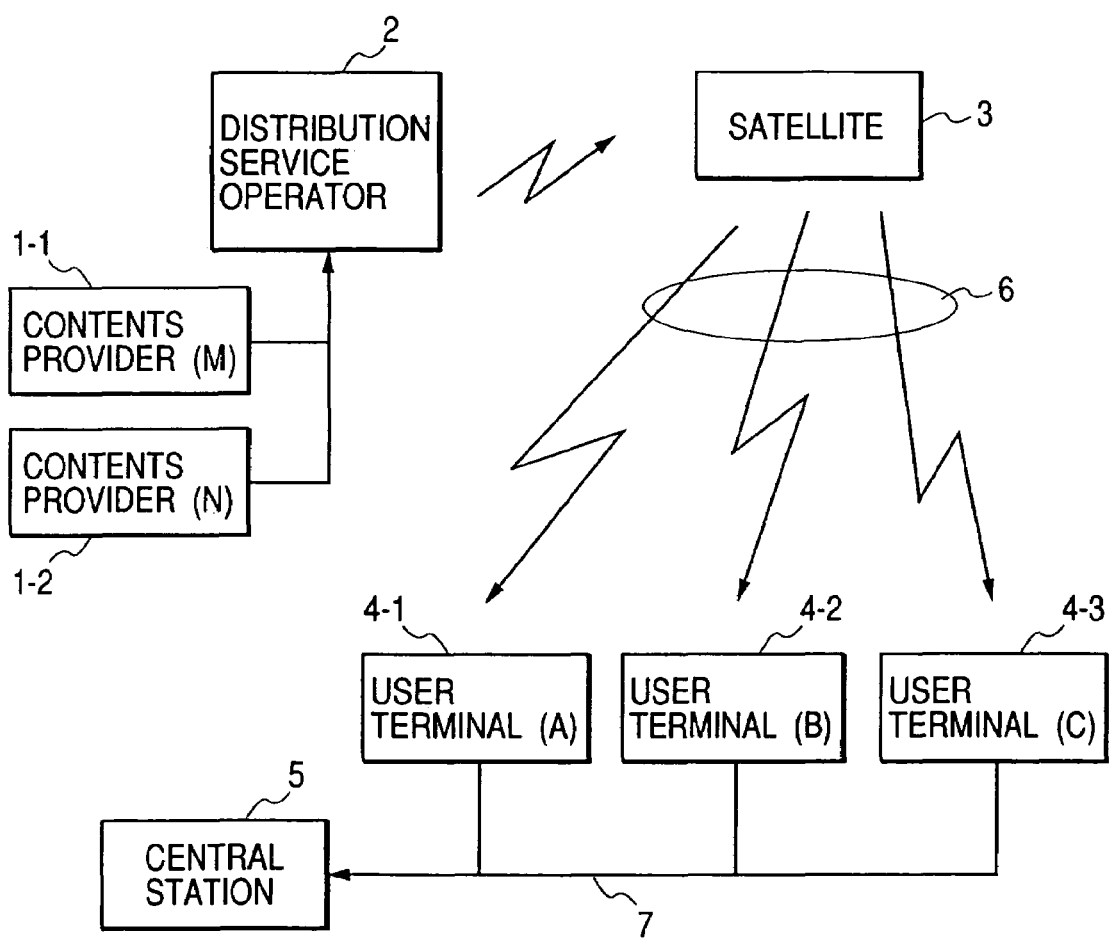
FIG. 1 is a block diagram showing an example of the configuration of a contents distribution system according to the present invention.

FIG. 1 is a block diagram showing an example of the configuration of a contents distribution system according to the present invention.

As shown in FIG. 1, the contents distribution system is provided with contents providers 1-1 and 1-2, a distribution service operator 2, a satellite 3, user terminals 4-1 to 4-3, a central station 5, a satellite line 6 and a public line 7. The contents providers 1-1 and 1-2 mean the providers of digital contents such as newspaper articles, a magazine, music, images and software and the distribution service operator 2 encrypts contents provided by the contents providers 1-1 and 1-2 and distributes them to user terminals 4-1 to 4-3 via the satellite line 6 utilizing the satellite 3. The user terminals 4-1 to 4-3 decodes contents distributed to each, displays and prints them, the central station 5 collects accounting data from the user terminals 4-1 to 4-3 via the public line 7 and manages it.

In the example of the configuration shown in FIG. 1, contents are distributed via the satellite line 6, however, contents may also be distributed via a network such as the Internet or utilizing media such as CD-ROM.

The contents provider 1 (1-1 and 1-2), the distribution service operator 2, the user terminal 4 (4-1, 4-2 and 4-3) and the central station 5 respectively composing the contents distribution system will be described below.

[1] Contents Provider

The contents provider 1 means a provider of digital contents such as newspaper articles, a magazine, music, images and software, and here, the contents provider 1-1 is a publisher M and the contents provider 1-2 is a newspaper publishing company N. In this case, contents provided by each company include an electronic magazine and electronic newspaper articles.

[2] Distribution Service Operator

The distribution service operator 2 receives contents from each contents provider and generates contents related information such as an icon file and the summary based upon the contents. Next, the distribution service operator encrypts each content and issues a ticket for the encrypted contents.

For the type of an issued ticket, there area signed ticket 10 and an unsigned ticket 20 respectively shown in FIG. 2, the signed ticket 10 is composed of decoding key information 11, contents ID 12, provider ID 13, points/page 14 and the number of pages 15 and the unsigned ticket 20 is composed of decoding key information 21, contents ID 22, provider ID 23, points/page 24 and the number of pages 25. The decoding key information 11 in the signed ticket 10 is customized for a specific user and the decoding key information 12 in the unsigned ticket 20 is customized for all users. For example, if the signed ticket 10 is issued so that only a user A (the user terminal 4-1) can utilize the contents N1 of the newspaper publishing company N (the contents provider 1-2), a decoding key for decoding the contents N1 is calculated based upon the decoding key information 11 and intrinsic information described later with which the user A is provided. If the unsigned ticket 20 is issued so that the user A (the user terminal 4-1), a user B (the user terminal 4-2) and a user C (the user terminal 4-3) which are respectively all users can utilize the contents M1 of the publisher M (the contents provider 1-1), a decoding key for decoding the contents M1 is calculated based upon the decoding key information 21 and information common to all users described later.

Figure 3:
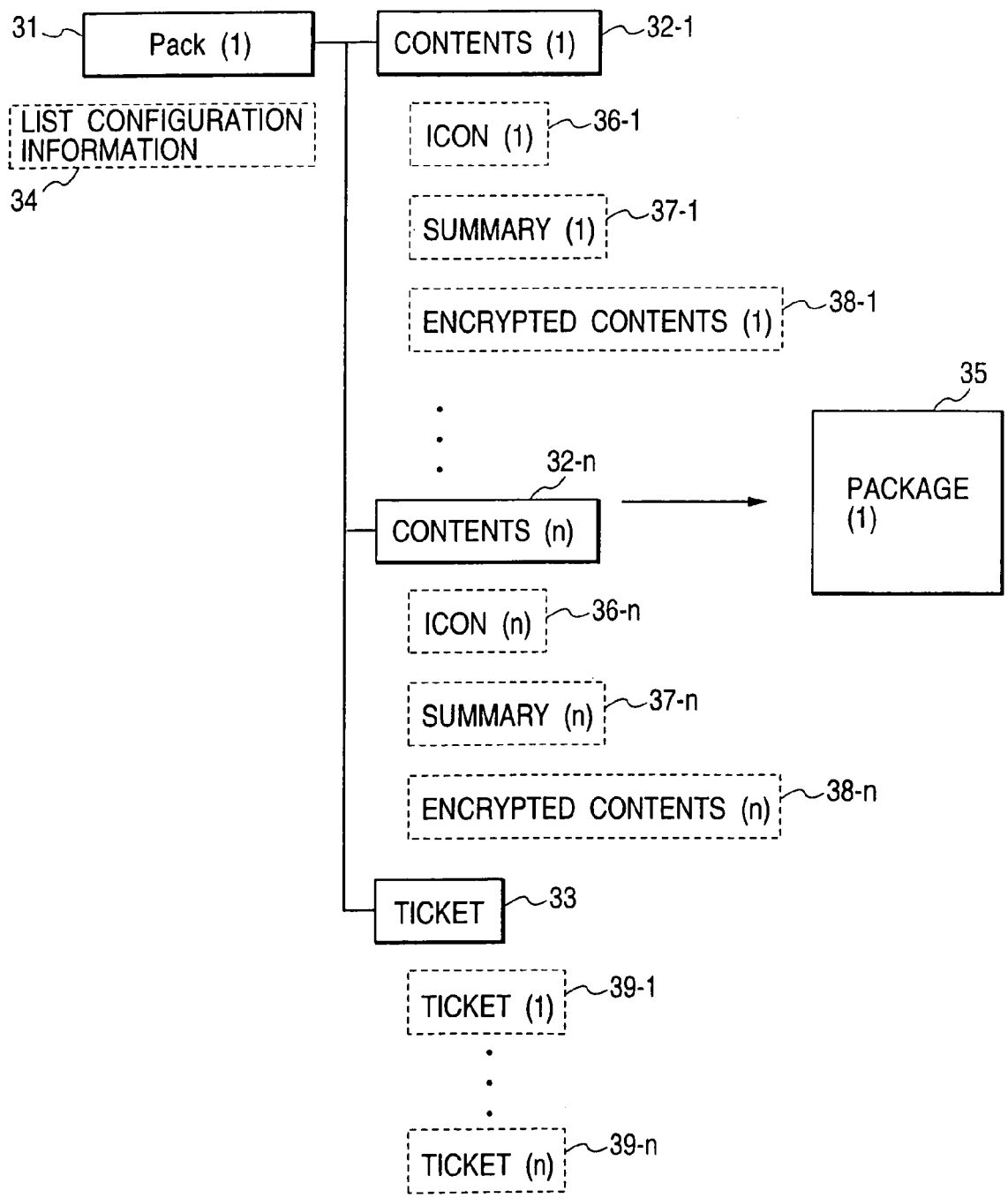
FIG. 3 explains the packaging of contents.

The distribution service operator 2 generates the configuration information of a contents list when the distribution service operator finishes the issue of a ticket and packages each contents, contents related information, contents list configuration information and tickets. For example, as shown in FIG. 3, contents (1) folder 32-1 to contents (n) folder 32-*n* and a ticket folder 33 are stored in Pack (1) folder 31 and are packaged together with list configuration information 34 in a package (1) 35. An icon (1) 36-1 which is contents related information, the summary (1) 37-1 and encrypted contents (1) 38-1 which are the body of the contents are stored in the contents (1) folder 32-1, and a ticket (1) 39-1 to a ticket (n) 39-*n* are stored in the ticket folder 33.

Next, the distribution service operator 2 broadcasts the packaged contents to each user (the user terminals 4-1 to 4-3) according to a distribution schedule.

The distribution service operator 2 may only distribute contents and in this case, the contents provider 1 (1-1 and 1-2) executes a series of operation up to packaging.

[3] User Terminal

Next, the user terminal 4 (4-1 to 4-3) will be described.

Figure 4:
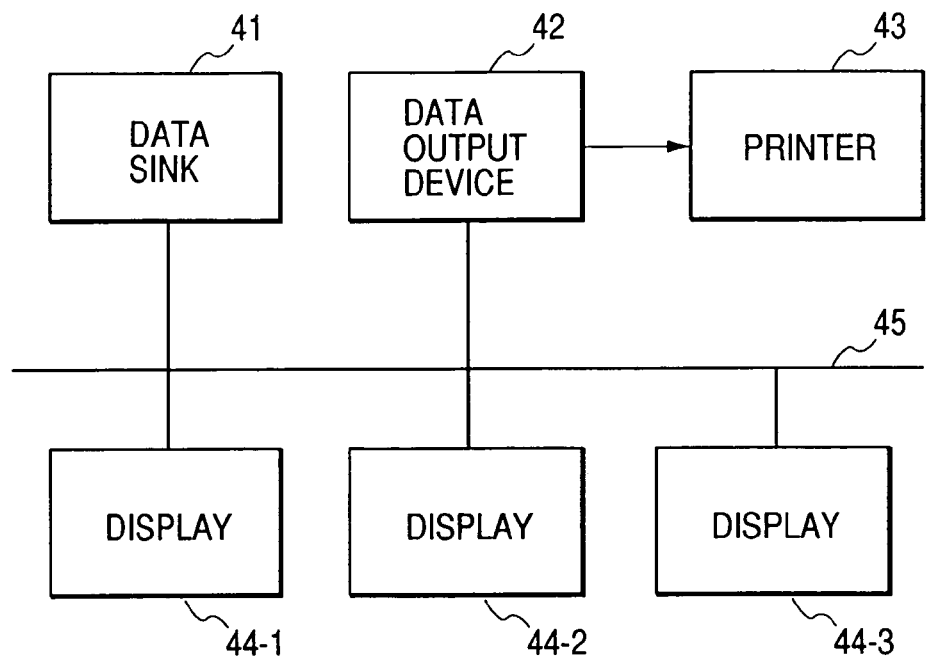
FIG. 4 is a block diagram showing the configuration of a user terminal 4.

FIG. 4 is a block diagram showing the configuration of the user terminal 4.

As shown in FIG. 4, the user terminal 4 is composed of a data sink 41, a data output device 42, a printer 43, displays 44-1 to 44-3 and a network 45.

The data sink 41 receives contents distributed by the distribution service operator 2, the data output device 42 stores contents received by the data sink 41 and outputs contents at the request of a user. The printer 43 and the displays 44 (44-1 to 44-3) respectively prints and display contents at the request of a user.

The details of each unit composing the user terminal 4 will be described below.

[3-1] Data Sink

Figure 5:
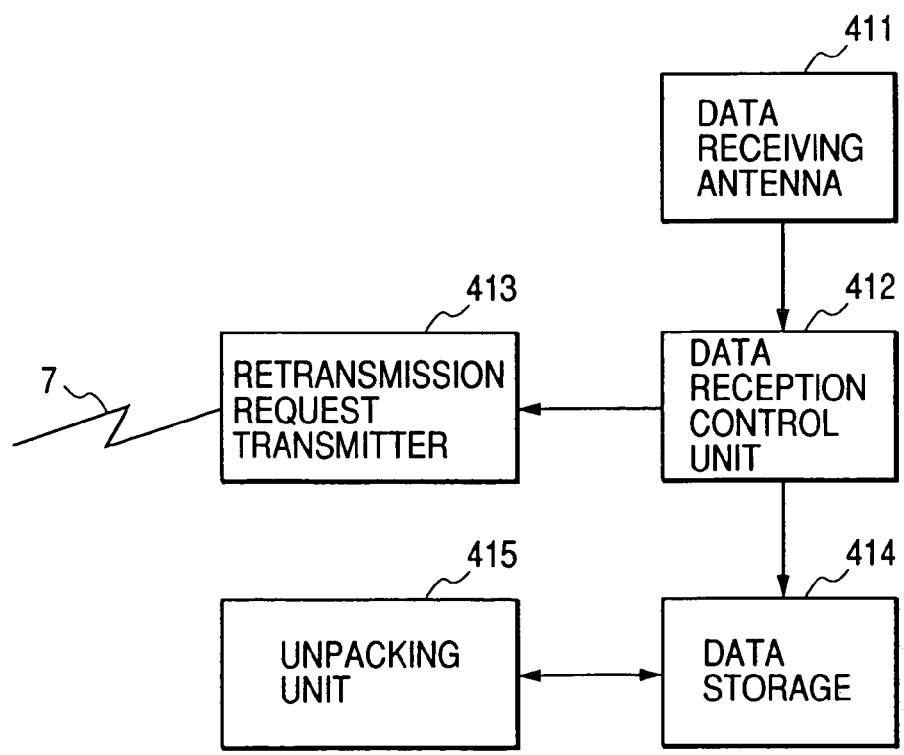
FIG. 5 is a block diagram showing the configuration of a data sink 41.

FIG. 5 is a block diagram showing the configuration of the data sink 41.

The data sink 41 is composed of a data receiving antenna 411, a data reception control unit 412, a retransmission request transmitter 413, a data storage 414 and a unpacking unit 415.

The data receiving antenna 411 receives distributed data and the data reception control unit 412 controls the reception of data. The retransmission request transmitter 413 requests the distribution service operator 2 to retransmit data via the public line 7 and others if an error occurs in reception. The data storage 414 stores received data and a package acquired by packaging the data, and the unpacking unit 415 unpacks received data stored in the data storage 414.

Figure 6:
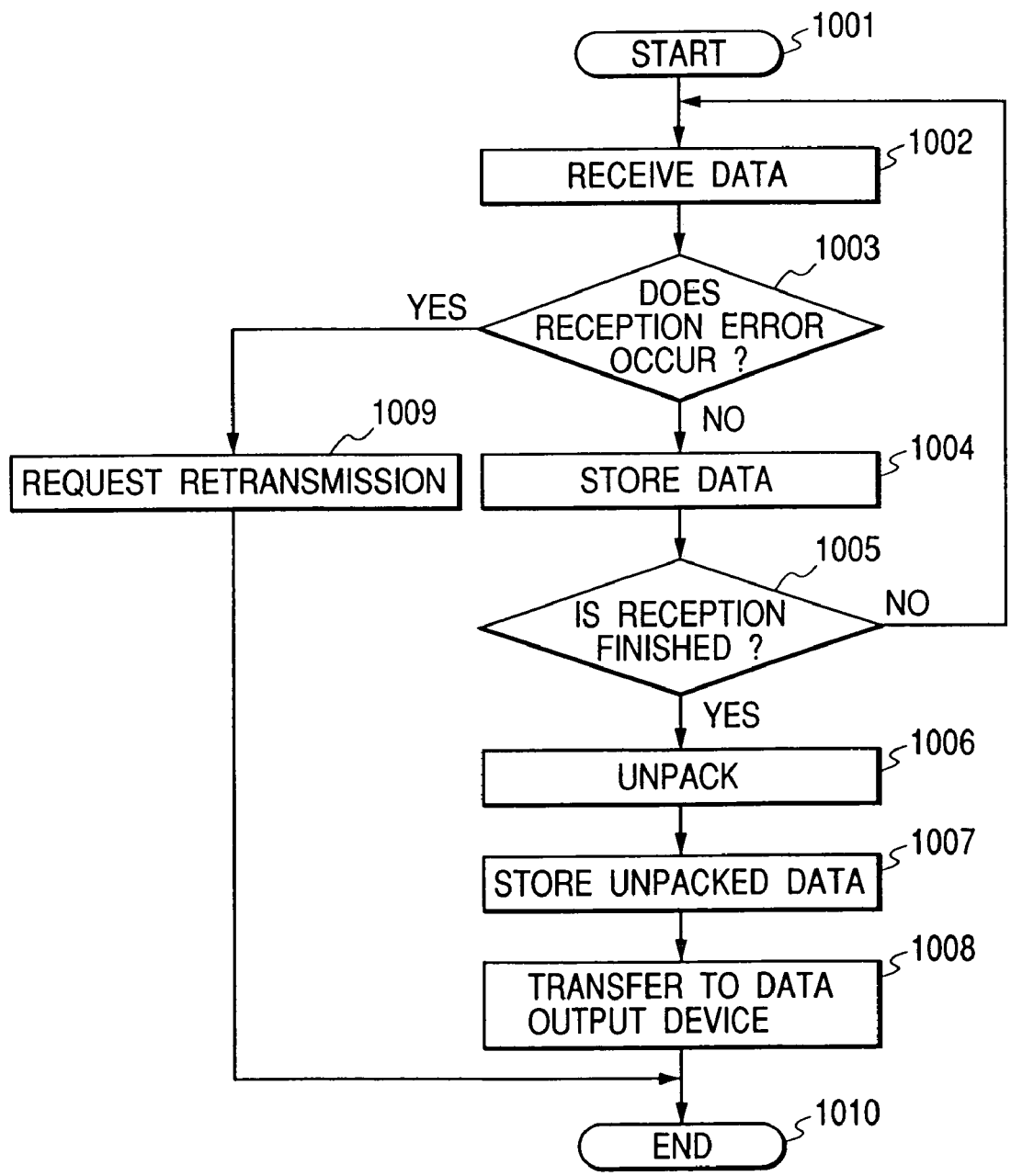
FIG. 6 is a flowchart showing the flow of the operation of the data sink 41.

FIG. 6 is a flowchart showing the flow of the operation of the data sink 41.

In the data sink 41, when operation is started in a step 1001, the data receiving antenna 411 receives data distributed by the distribution service operator 2 in a step 1002, the data reception control unit 412 stores the received data in the data storage 414 in a step 1004 if no error occurs in reception (NO in a step 1003) and repeats the above processing (in the steps 1002 to 1004) (No in a step 1005) until reception is finished.

When reception is finished (YES in the step 1005), the unpacking unit 415 unpacks data stored in the data storage 414 in a step 1006 and stores unpacked data in the data storage 414 in a step 1007. Afterward, the unpacked data stored in the data storage 414 is transferred to the data output device 42 in a step 1008 and the processing is terminated in a step 1010.

In the meantime, if an error occurs in data received by the data receiving antenna 411 (YES in the step 1003), the retransmission request transmitter 413 requests the distribution service operator 2 to retransmit data via the public line 7 and others in a step 1009 and the processing is terminated in the step 1010.

Figure 7:
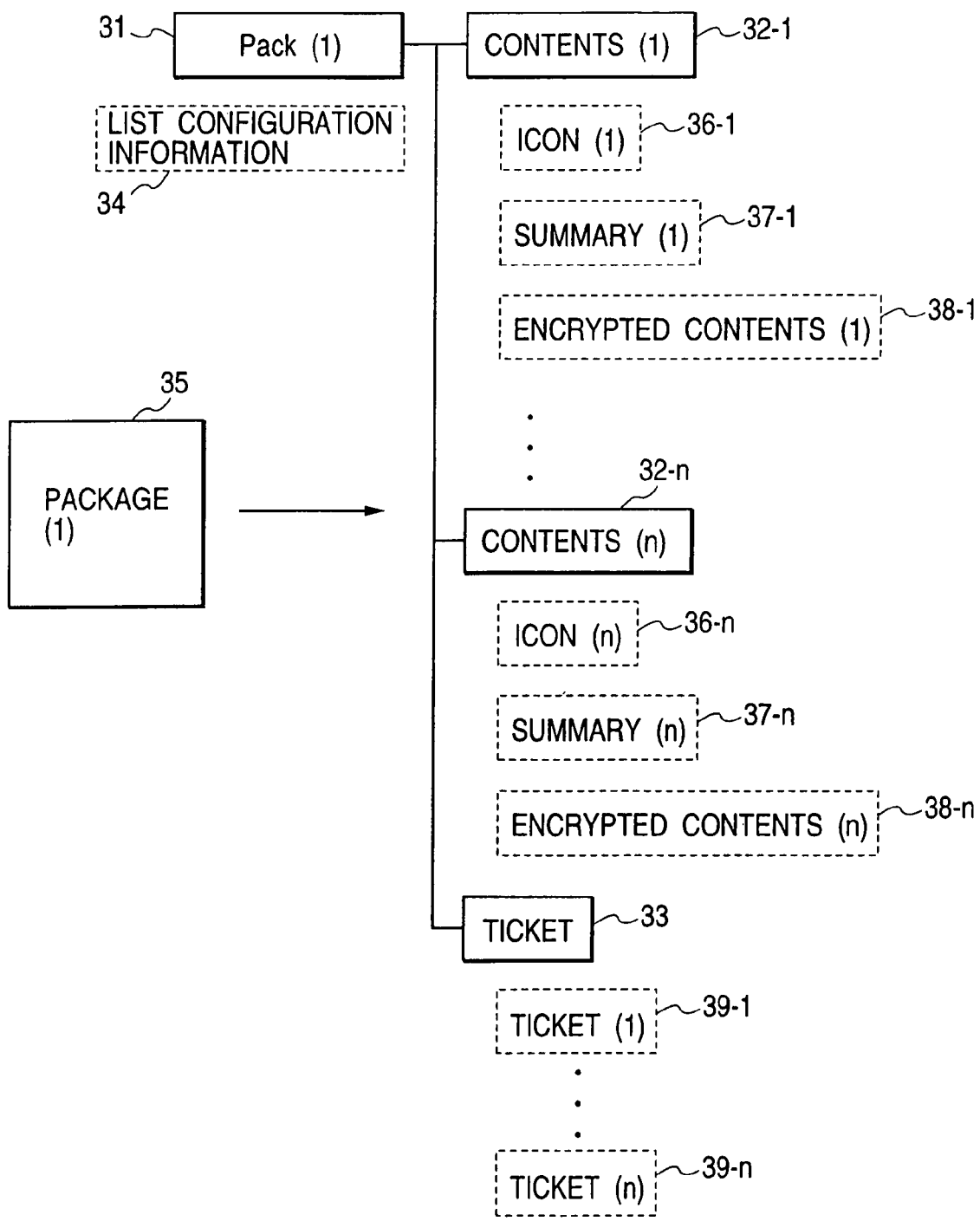
FIG. 7 explains unpacking.

As for the processing executed by the unpacking unit 415 in the step 1006, as shown in FIG. 7, the package (1) 35 is expanded into list configuration information 34 and Pack (1) folder 31. The contents (1) folder 32-1 to the contents (n) folder 32-*n* and the ticket folder 33 are stored in the Pack (1) folder 31, the icon (1) 36-1 which is contents related information, the summary (1) 37-1 and encrypted contents (1) 38-1 which are the body of the contents are stored in the contents (1) folder 32-1, and the ticket (1) 39-1 to the ticket (n) 39-*n* are stored in the ticket folder 33.

[3-2] Data Output Device

Figure 8:
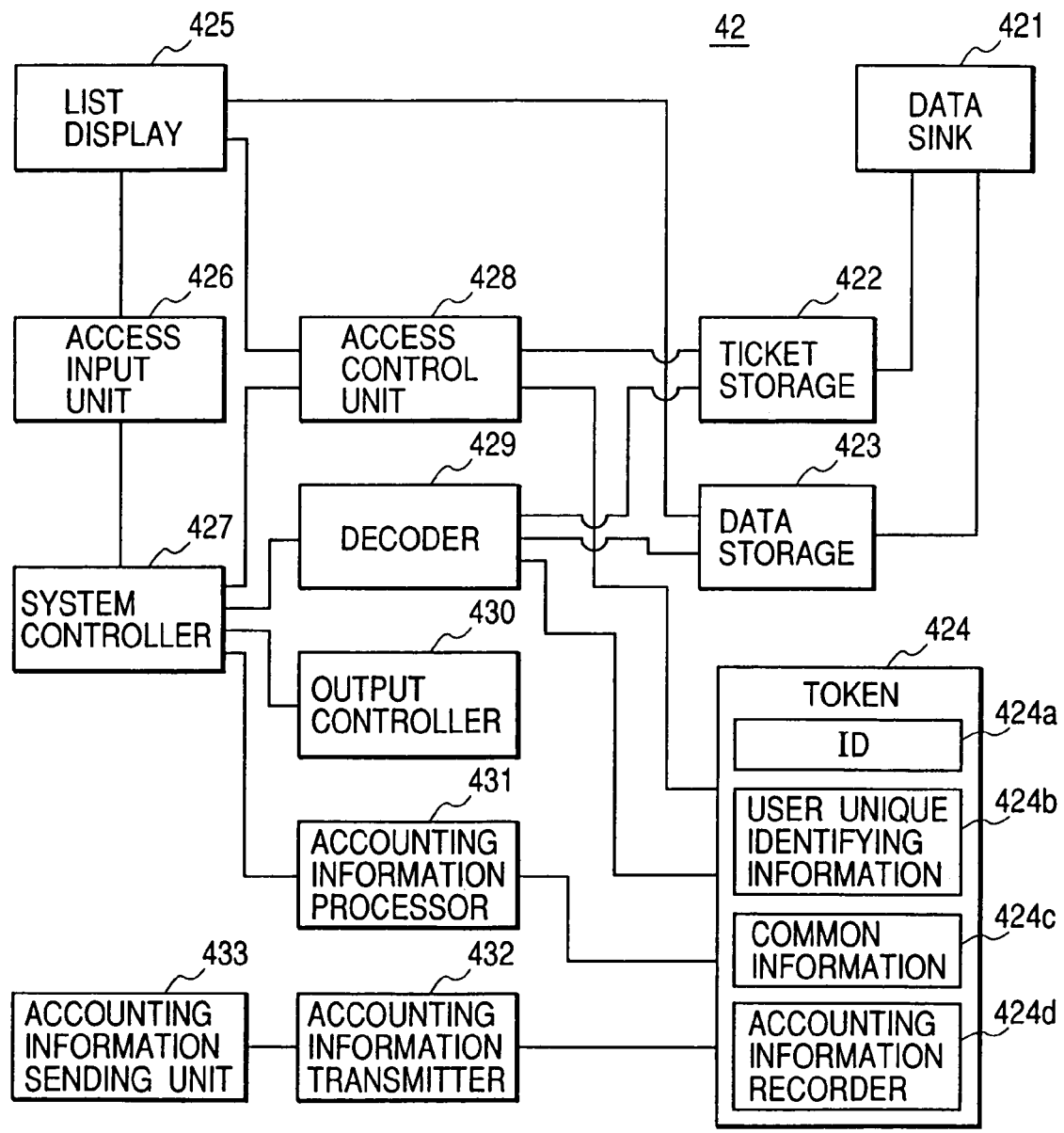
FIG. 8 is a block diagram showing the configuration of a data output device 42.

FIG. 8 is a block diagram showing the configuration of the data output device 42.

The data output device 42 is composed of a data sink 421, a ticket storage 422, a data storage 423, a token 424, a list display 425, an access input unit 426, a system controller 427, an access control unit 428, a decoder 429, an output controller 430, an accounting information processor 431, an accounting information transmitter 432 and an accounting information transmission instruction processing unit 433.

The data sink 421 receives data transferred from the data sink 41, the ticket storage 422 stores the ticket 39 (39-1 to 39-*n* shown in FIG. 7) of the data received by the data sink 421 and the data storage 423 stores list configuration information 34 and the contents folder 32 (the contents folder (1) 32-1 to the contents folder (n) 32-*n*).

The token 424 includes various information such as ID 424*a*, user unique identifying information 424*b*, common information 424*c* and accounting information in an accounting information recorder 424*d* and is composed by an IC card for example.

The list display 425 displays a list of contents based upon the list configuration information 34 stored in the data storage 423 on a monitor not shown. The access input unit 426 is an interface for a user to input desired contents and its output information (paper size, the number of pages printed on one sheet, the number of pages and others) based upon the list of contents displayed on the list display 425 and is composed by a touch panel and others. The system controller 427 operates each element of the data output device 42 and controls access, decoding processing, accounting information processing and others. The access input unit 426 is equivalent to a keyboard and a mouse in case a personal computer and others are used for the data output device 42 and is equivalent to a touch panel in case the printer 43 is provided with a control panel such as a touch panel.

The access control unit 428 checks access to the encrypted contents 38 stored in the data storage 423 based upon each information stored in the token 424 and the decoding key information of a ticket and the decoder 429 decodes the encrypted contents 38 based upon the ticket 39 stored in the ticket storage 422 and the user unique identifying information 424*b* or the common information 424*c* in the token 424.

The output controller 430 outputs the contents decoded by the decoder 429 to the printer 43 according to output information input from the access input unit 426, the accounting information processor 431 acquires accounting information from each unit after the output of the contents and records it in the accounting information recorder 424d in the token 424. In this case, it is described that the accounting information recorder 424d is in the token 42, however, the accounting information recorder 424d may also be on a record medium such as a hard disk not shown with which the user terminal 4 is provided.

The accounting information transmitter 432 transmits accounting information recorded in the accounting information recorder 424d to the central station 5 via the public line 7 and others (or sends the token of an IC card and portable media such as a floppy disk by mail) and the accounting information transmission instruction processing unit 433 instructs the accounting information transmitter 432 to transmit accounting information according to a preset schedule and others.

Figure 9:
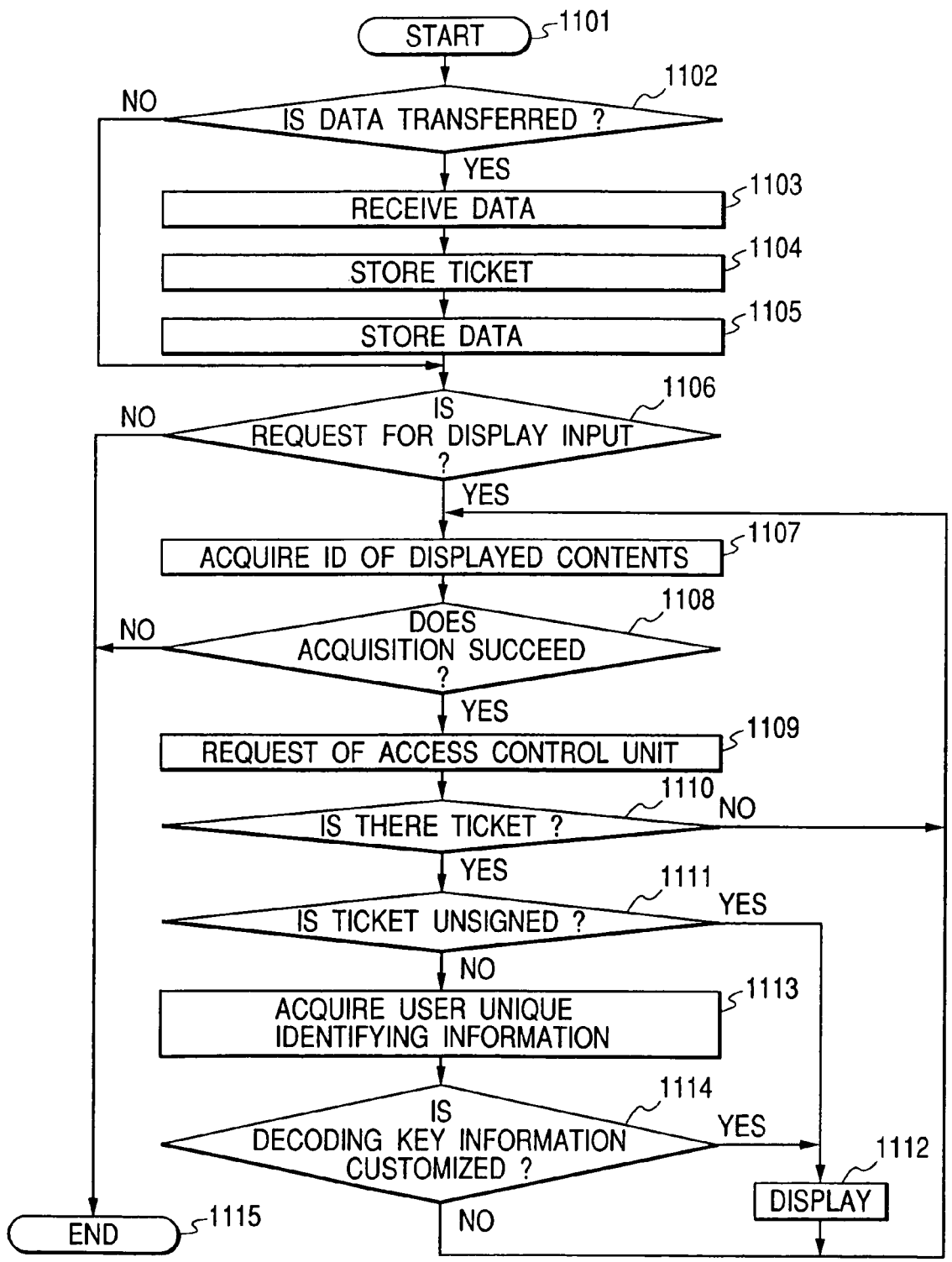
FIG. 9 is a flowchart showing the flow of list display processing.

Referring to FIG. 9, list display processing for displaying a list of contents will be described below. The list display 425 can select contents the list of which can be displayed depending upon whether a ticket is stored in the ticket storage 422 or not.

FIG. 9 is a flowchart showing the flow of list display processing.

When list display processing is started in a step 1101 and data is transferred from the data sink 41 (YES in a step 1102), the data sink 421 receives the data in a step 1103, stores the ticket 39 (39-1 to 39-n) in the ticket folder 33 of the received data in the ticket storage 422 in a step 1104 and stores the icon 36, the summary 37 and the encrypted contents 38 respectively in the contents folder 32 and the list configuration information 34 in the data storage 423 in a step 1105. Next, when a request for displaying a list of contents is input from the access input unit 426 (YES in a step 1106), the list display 425 acquires ID of displayed contents based upon the list configuration information 34 in a step 1107.

If contents ID is acquired (YES in a step 1108), the list display 425 requests the access control unit 428 to check whether a ticket corresponding to the acquired contents ID exists or not in a step 1109. The access control unit 428 inquires of the ticket storage 422 whether the ticket corresponding to the contents ID exists or not in a step 1110.

If the ticket is an unsigned ticket 20 (YES in a step 1111) in case the ticket is stored in the ticket storage 422 (YES in the step 1110), the list display 425 is informed that the list can be displayed and the list display 425 displays the list in a step 1112.

In the meantime, as the following ticket is a signed ticket 10 if a ticket stored in the ticket storage 422 is not an unsigned ticket 20 (NO in the step 1111), the access control unit 428 acquires user unique identifying information 424b from the token 424 and calculates whether the decoding key information 11 of the signed ticket 10 is customized for the user unique identifying information 424b or not in a step 1113. As a result of calculation, if the decoding key information 11 is customized for the user unique identifying information 424b (YES in a step 1114), the list display 425 is informed that the list can be displayed, the list display 425 displays the list in a step 1112 and if the decoding key information 11 is not customized for the user unique identifying information 424b (No in the step 1114), the list display 425 acquires the next contents ID based upon the list configuration information 34 without displaying in a step 1107.

Processing after the step 1107 is repeated as long as the acquisition of contents ID succeeds (YES in the step 1108) and when the acquisition of contents ID fails, that is, processing for all contents IDs is finished (NO in the step 1108), the list display processing is terminated in a step 1115.

When a list is displayed, the icon 36 and the summary 37 respectively stored in the data storage 423 are displayed at the request of a user or if necessary. When the icon 36 is selected using a touch panel, a mouse or a keyboard, the corresponding contents are selected, the summary 37 shows the summary, the table and others of the corresponding contents and a user utilizes the icon and the summary to select contents and required pages in contents.

Next, referring to FIG. 10, the output processing of contents will be described.

Figure 10:
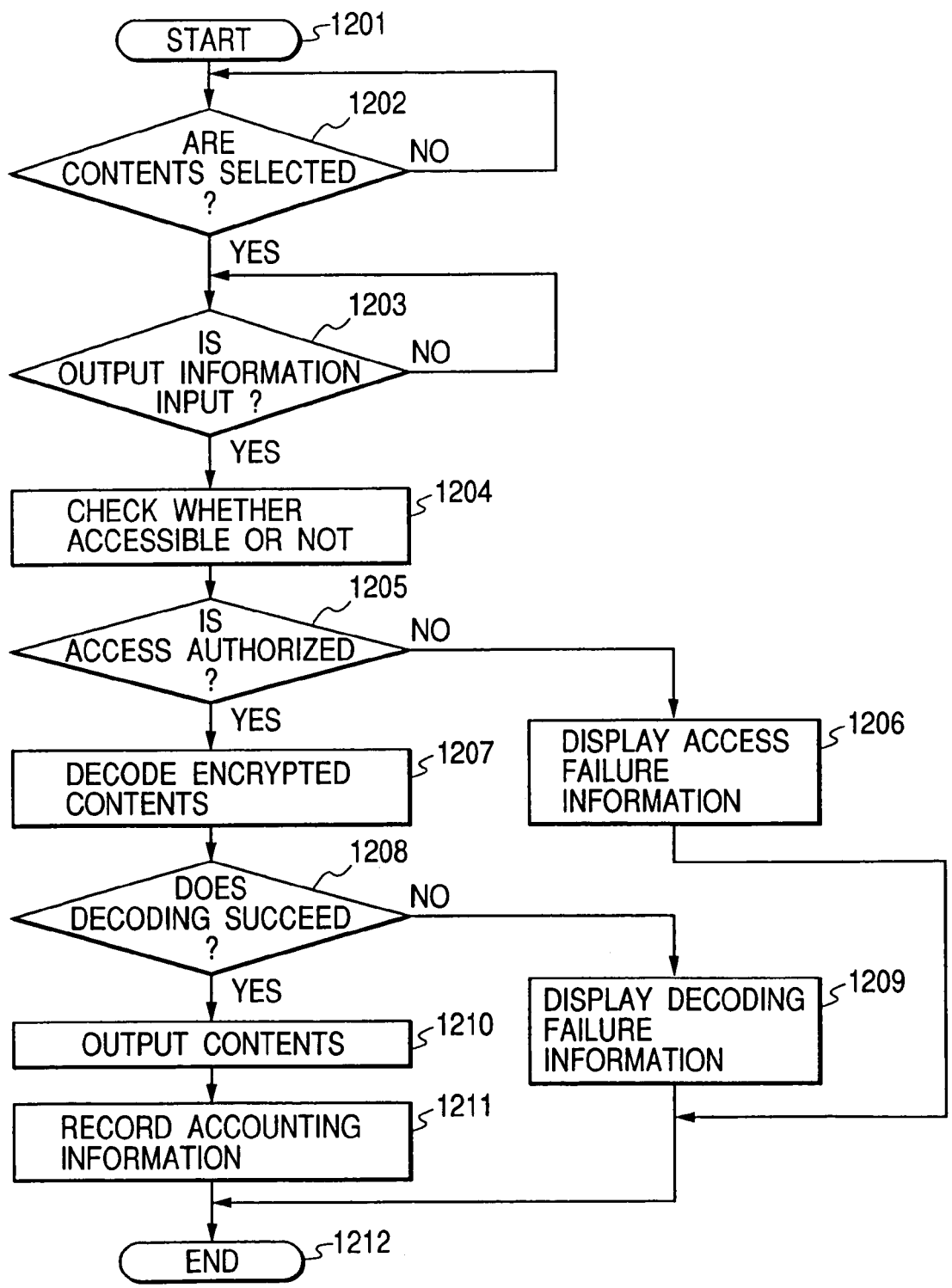
FIG. 10 is a flowchart showing the flow of the output processing of contents.

FIG. 10 is a flowchart showing the flow of the output processing of contents.

When a request for the output of contents is input from the access input unit 426, the output processing of contents is started in a step 1201, when a user selects contents from the access input unit 426 (YES in a step 1202) and output information is input (YES in a step 1203), the access control unit 428 checks whether the token 424 exists or not and its legitimacy and checks whether the ticket 39 corresponding to the selected contents is stored in the ticket storage 422 or not and whether the ticket is falsified or not, that is, whether access to the selected contents is authorized or not in a step 1204.

As a result of checking whether the access is authorized or not, if the access is not authorized (NO in a step 1205), the system controller 427 instructs the monitor to display information showing access is not authorized in a step 1206 and terminates the output processing of contents in a step 1212.

In the meantime, as a result of checking whether access is authorized or not, if access is authorized (YES in the step 1205), the decoder 429 generates a decoding key based upon the ticket 39 corresponding to the selected contents and information (the user unique identifying information 424b in case the ticket is a signed ticket and the common information 424c in case the ticket is an unsigned ticket) in the token 424 and decodes the encrypted contents 38 in a step 1207.

If decoding fails (NO in the step 1208), the system controller 427 instructs the monitor to display decoding failure information in a step 1209 and terminates the output processing of contents in the step 1212.

If decoding succeeds (YES in the step 1208), the output controller 430 outputs decoded contents to the printer 43 according to output information in a step 1210, the accounting information processor 431 generates accounting information based upon the used ticket 39, the encrypted contents 38, output information, the result of output and others, records it in the accounting information recorder 424d in a step 1211 and terminates the output processing of contents in the step 1212.

As described above, accounting information is generated only in case the output of contents succeeds and is not generated, that is, accounting is not executed if decoding fails. If printing fails halfway even if decoding succeeds, accounting is executed only for the number of pages of output contents.

Accounting information is composed of "ID", "contents ID", "provider ID", "date", "number of pages included in contents", "printed number", "number of pages printed on one sheet and paper size", "points per page", "user ID" and "termination status" respectively shown in FIG. 11.

"ID" means ID for identifying accounting issued by the accounting information processor 431 and "contents ID" means ID acquired from the ticket 39 of utilized contents. "Provider ID" means ID acquired from the ticket 39 of a contents provider that provides utilized contents and "date" means a date when contents issued by the system controller 427 are utilized. "Contents total page number" means the number of pages acquired from the ticket 39 and included in contents requested to be output and "printed number" is information showing the number of sheets acquired from the output controller 430 and actually printed by the printer 43. "Number of pages printed on one sheet, paper size" is information showing the number of pages acquired from the output controller 430 and printed on one sheet, the size and the direction of printing paper and "points per page" is information showing the number of points or a price per page acquired from the ticket 39. "User ID" means ID acquired from ID 424a in the token 424 of a user that utilizes contents and "termination status" means information including error information in case the result of output from the output controller 430 is abnormal output and is acquired from the system controller 427.

Accounting information generated under these items is normally added every time contents are output as plural accounting information as shown in FIG. 12, is stored in the accounting information recorder 424d and is transmitted to the central station 5 according to a predetermined schedule and others. As accounting information may be falsified while it is transmitted to the central station 5, security such as digital signature may also be applied to accounting information.

[3-3] Printer

For the printer 43, a printer heretofore used and a compound device that simultaneously functions as a printer, a copying machine and a facsimile are used. Therefore, the description of the printer 43 is omitted.

[3-4] Display

Figure 13:
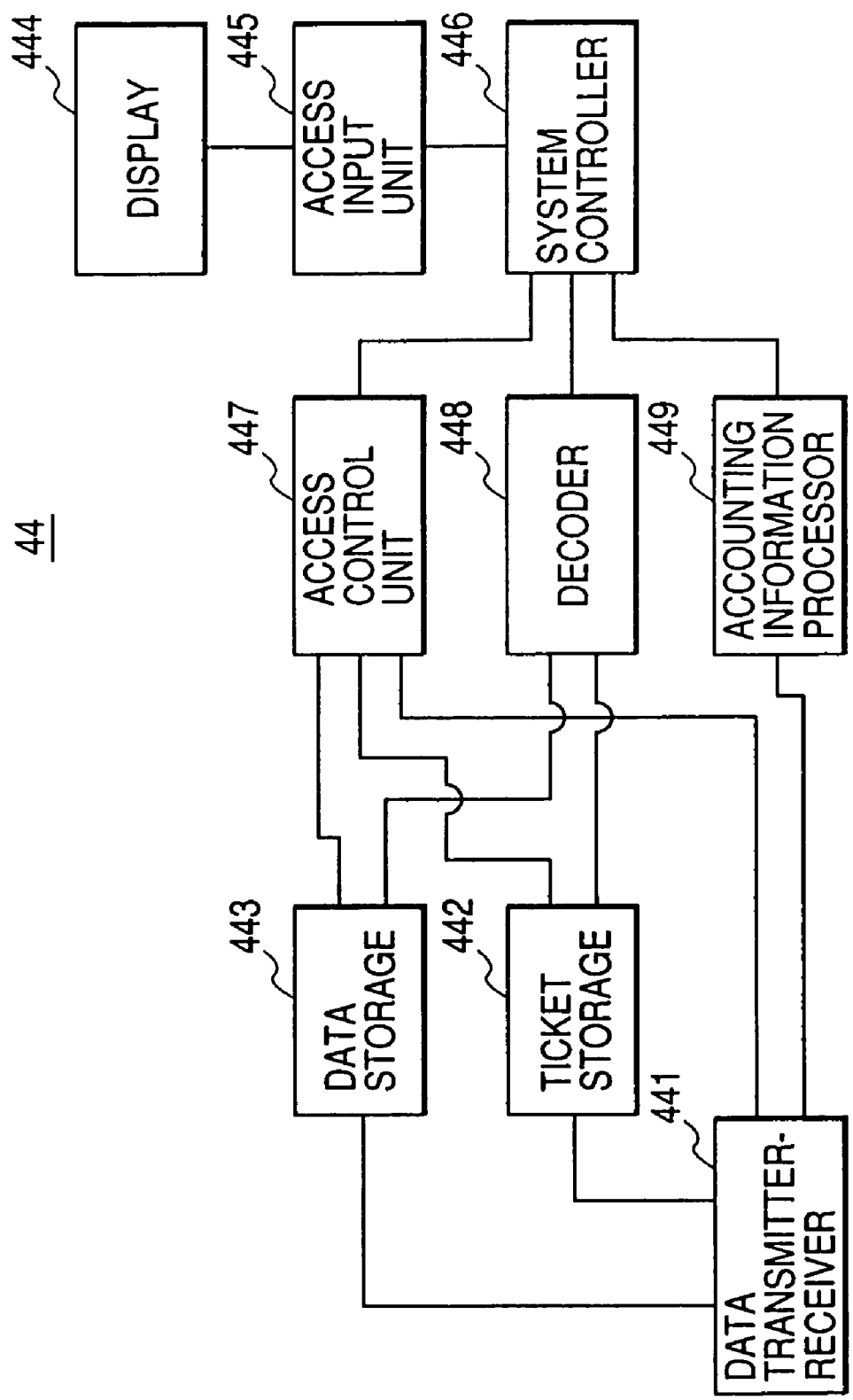
FIG. 13 is a block diagram showing the configuration of a display 44.

FIG. 13 is a block diagram showing the configuration of the display 44 (44-1 to 44-3).

The display 44 is composed of a data transmitter-receiver 441, a ticket storage 442, a data storage 443, a display 444, an access input unit 445, a system controller 446, an access control unit 447, a decoder 448 and an accounting information processor 449.

The data transmitter-receiver 441 is connected to the data sink 41 and the data output device 42 via the network 45, receives data transferred from the data sink 41, receives and transmits data from/to the data output device 42. The ticket storage 442 stores the ticket 39 (39-1 to 39-n shown in FIG. 7) of data received by the data transmitter-receiver 441 and the data storage 443 stores list configuration information 34 and a contents folder 32 (contents folder (1) 32-1 to contents folder (n) 32-n).

The display 444 displays a list of contents on a monitor not shown based upon the list configuration information 34 stored in the data storage 443 and also displays contents. The access input unit 445 is an interface for a user to input desired contents and its output information such as paper size, the number of pages printed on one sheet and the number of pages based upon the list of contents displayed by the display 444 and is composed by a touch panel and others. The system controller 446 operates each unit of the display 44 and controls access, decoding, accounting information processing and others.

The access control unit 447 checks access to the encrypted contents 38 stored in the data storage 443 based upon each information item stored in the token 424 of the data output device 42 and the decoder 448 decodes the encrypted contents 38 based upon the ticket 39 stored in the ticket storage 442 and user unique identifying information 424b or common information 424c in the token 424. The accounting information processor 449 acquires accounting information from each unit after the utilization of contents and records it in the accounting information recorder 424d in the token 424.

Figure 14:
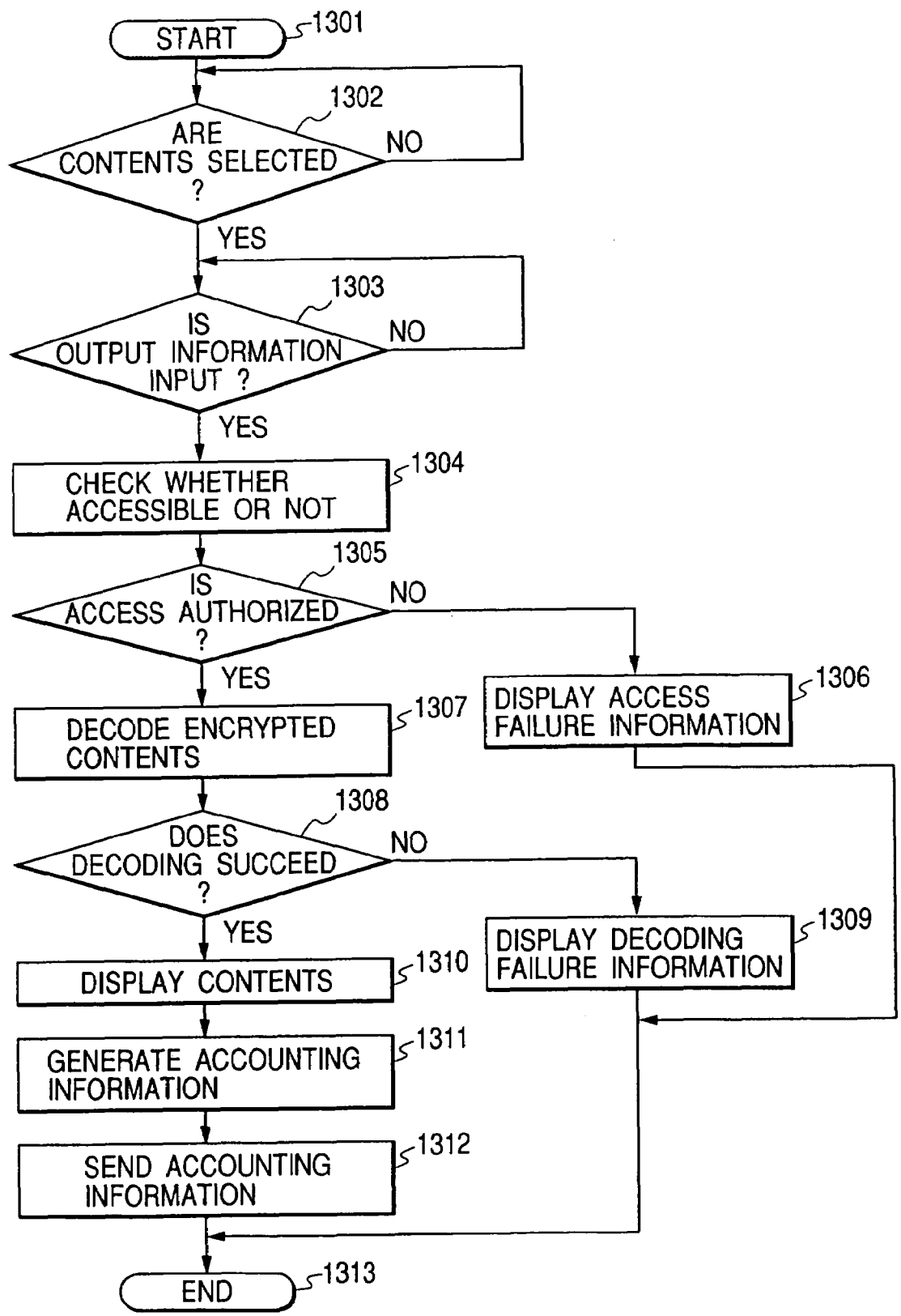
FIG. 14 is a flowchart showing the flow of the display processing of contents.

Referring to FIG. 14, the display processing of contents will be described below.

FIG. 14 is a flowchart showing the flow of the display processing of contents.

When a request for displaying contents is input from the access input unit 445, the display processing of contents is started in a step 1301, when a user selects contents via the access input unit 445 (YES in a step 1302) and inputs output information (YES in a step 1303), the access control unit 447 checks whether the token 424 exists or not and its legitimacy via the data transmitter-receiver 441, checks whether the ticket 39 corresponding to the selected contents is stored in the ticket storage 442 or not and checks whether the ticket 39 is falsified or not, that is, whether access to the selected contents is authorized or not in a step 1304.

As a result of checking whether the access is authorized or not, if the access is not authorized (NO in a step 1305), the system controller 447 instructs the display 444 to display information showing the access is not authorized in a step 1306 and terminates the display processing of the contents in a step 1313.

In the meantime, as a result of checking whether access is authorized or not, if the access is authorized (YES in the step 1305), the decoder 448 generates a decoding key based upon the ticket 39 corresponding to the selected contents and information in the token 424 (user unique identifying information 424b in case the ticket is a signed ticket and common information 424c in case the ticket is an unsigned ticket) and decodes the encrypted contents 38 in a step 1307.

If decoding fails (NO in a step 1308), the system controller 446 instructs the display 444 to display information showing that decoding fails in a step 1309 and terminates the display processing of the contents in the step 1313.

If decoding succeeds (YES in the step 1308), the system controller 446 instructs the display 444 to display the decoded contents according to output information in a step 1310, the accounting information processor 449 generates accounting information based upon the used ticket 39, the encrypted contents 38, output information, the result of output and others in a step 1311, transmits the accounting information to the data output device 42 via the data transmitter-receiver 441 in a step 1312 and terminates the display processing of the contents in the step 1313.

Next, referring to FIG. 15, the processing of accounting information transferred from the display 44 to the data output device 42 will be described.

Figure 15:
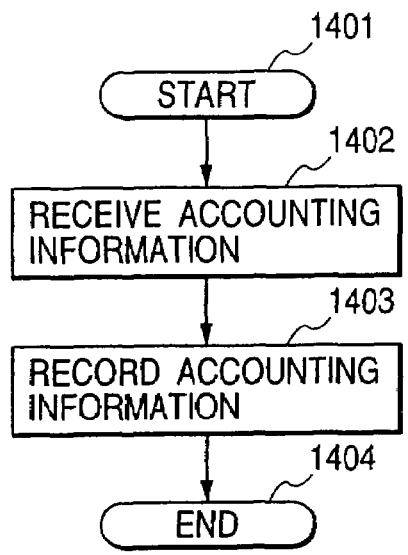
FIG. 15 is a flowchart showing the flow of the processing of accounting information in the data output device 42.

FIG. 15 is a flowchart showing the flow of the processing of accounting information in the data output device 42.

When the data output device 42 starts processing in a step 1401 and receives accounting information from the display 44 in a step 1402, the system controller 427 instructs the accounting information processor 431 to record accounting information, the accounting information processor 431 records the received accounting information in the accounting information recorder 424d in a step 1403 and terminates accounting information processing in a step 1404.

As described above, the display 44 decodes and displays contents encrypted in each device. Therefore, as contents flow on the network 45 with the contents encrypted, the unfair copying of contents in the network 45 can be prevented.

[4] Central Station

Next, the central station 5 will be described.

Figure 16:
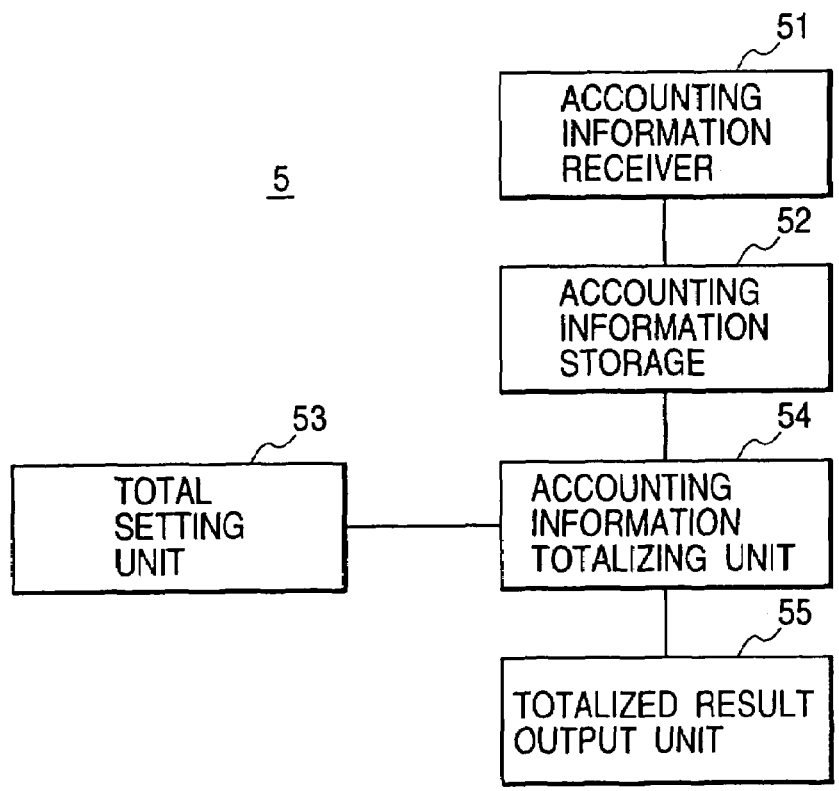
FIG. 16 is a block diagram showing the configuration of a central station 5.

FIG. 16 is a block diagram showing the configuration of the central station 5.

As shown in FIG. 16, the central station 5 is composed of an accounting information receiver 51, an accounting information storage 52, a total setting unit 53, an accounting information totalizing unit 54 and a totalized result output unit 55. The accounting information receiver 51 receives accounting information transmitted from the data output device 42 of the user terminal 4 via the public line 7 and others, the accounting information storage 52 classifies and stores accounting information received by the accounting information receiver 51 for every user. The total setting unit 53 specifies totalized accounting information, the output destination of the totalized result and a totalizing format and others. The accounting information totalizing unit 54 totalizes accounting information stored in the accounting information storage 52 according to a condition specified by the total setting unit 53 and the totalized result output unit 55 outputs accounting information totalized by the accounting information totalizing unit 54 to a file and instructs the printer to print it.

Figures 17, 18:
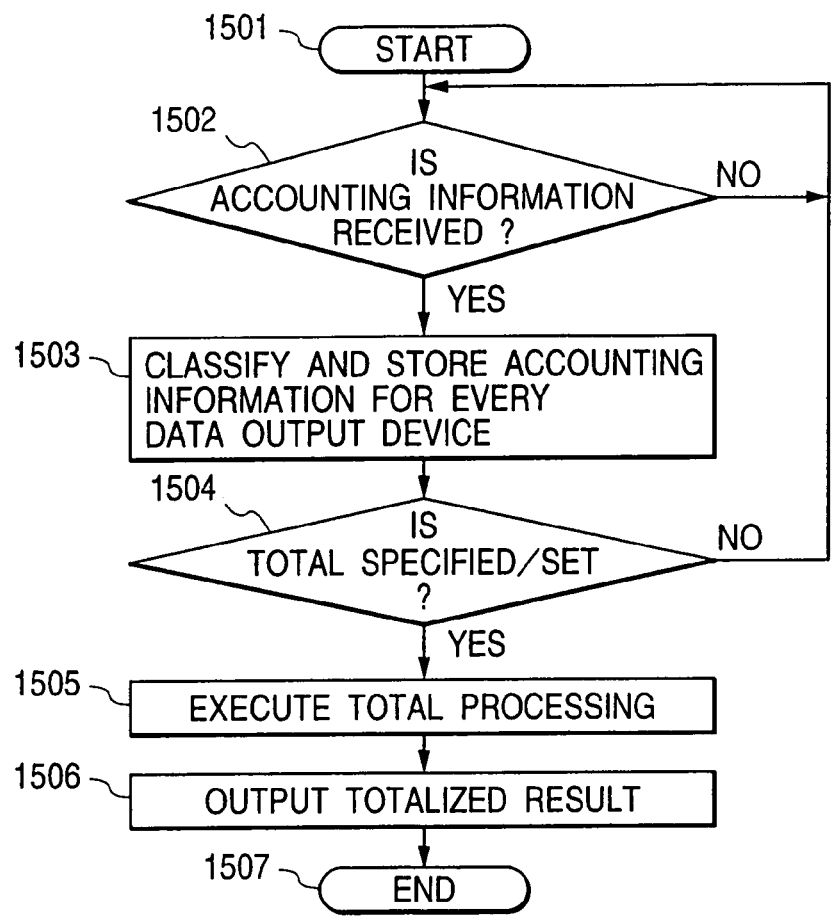
FIG. 17 is a flowchart showing the flow of accounting information totalizing processing.
FIG. 18 shows an example of the output of the totalized result.

Referring to FIG. 17, processing for totalizing accounting information will be described below.

FIG. 17 is a flowchart showing the flow of accounting information totalizing processing.

When the central station 5 starts operation in a step 1501 and the accounting information receiver 51 receives accounting information (YES in a step 1502), the received accounting information is stored in the accounting information storage 52 for every user, that is, for every data output device 42 in a step 1503. Accounting information is stored every time accounting information is received at timing set by the total setting unit 53 or until totalizing is started by an instruction by a person in charge of totalizing (NO in a step 1504).

When the start of totalizing is instructed (YES in the step 1504) at timing set by the total setting unit 53 or by the instruction by the person in charge of totalizing, the accounting information totalizing unit 54 totalizes accounting information stored in the accounting information storage 52 according to a condition set by the total setting unit 53 in a step 1505, the totalized result output unit 55 outputs the totalized result in a step 1506 and terminates accounting information totalizing processing in a step 1507.

Next, an example of totalizing by the accounting information totalizing unit 54 will be described.

In totalizing, first, information in "printed number", "number of pages printed on one sheet", "contents total-page number" and "points per page" in accounting information is acquired.

Next, the number of pages included in actually utilized contents will be calculated. In the above calculation, if a value acquired by multiplying "printed number" and "number of pages printed on one sheet", that is, "printed number× N" is larger than "contents total page number", the number of pages included in actually utilized contents is regarded as equal to "contents total page number" and if "printed number×N" is smaller than "contents total page number", the number of pages included in actually utilized contents is regarded as "printed number×N".

Next, the number of points is calculated, detailedly, is calculated by "the number of points per page×the number of pages included in actually utilized contents" based upon "points per page".

For an actual example of calculation, if a printed number is 3, the number of pages printed on one sheet is 2, a contents total page number is 5, points per page are 2 as an example 1, the number of pages included in actually utilized contents is 5 (3×2>5) and the number of points is 10 (2×5).

Also as an example 2, if a printed number is 3, the number of pages printed on one sheet is 2, a contents total page number is 6 and points per page are 2, the number of pages included in actually utilized contents is 6 (3×2=6) and the number of points is 12 (2×6).

Further, as an example 3, if a printed number is 1, the number of pages printed on one sheet is 2, a contents total page number is 3, points per page are 2, the number of pages included in actually utilized contents is 2 (1×2<3) and the number of points is 4 (2×2).

The information of totalization calculated as described above is output in a file or printed out as a list from the totalized result output unit 55 as shown in FIG. 18.

In the above embodiment, as for the display 44, a case where plural displays are connected to the data sink 41 and the data output device 42 via the network 45 is described, however, plural displays 44 are not necessarily required to be connected and if no more than one display is utilized, the network 45 is not required. One computer can also function as the display 44 and the data output device 42 and if the Internet and media such as CD-ROM are used on a path through which contents are distributed, the same computer can also function as the data sink 41. Further, some printers and some copying machines used for the printer 43 transfer accounting information using a public line, however, the system according to the present invention can also be composed utilizing the above device for transferring accounting information.

As described above, according to the present invention, as contents such as newspaper articles, a magazine, music, images and software are encrypted and distributed, a user who receives the encrypted contents decodes only desired contents and utilizes them and only the utilized contents are charged, so copyright on the side of a contents provider can be protected and a user can pay according to the quantity of utilized contents. Accounting information can be safely and readily recorded, collected and totalized.

As encrypted contents are decoded utilizing a ticket sent together with the contents and information in a token which a user has, different data is not required to be distributed for every user terminal which is a destination of distribution and a broadcast is allowed.

What is claimed is:

1. A contents distribution method for distributing digitized contents to plural end users, comprising the steps of:
encrypting and broadcasting contents together with a content related icon and summary information showing a summary of the encrypted contents to the plural end users;
providing decoding information accompanying encrypted contents, each decoding information specific to an end user in the plural end users,
wherein the decoding information determines which encrypted contents among the broadcasted contents can be utilized by the end user;
selecting by the end user, by clicking on the icon and based on review by the end user of the summary information received, at least one of the encrypted content from the broadcasted contents that can be utilized by the end user;

generating a decoding key that decodes the encrypted content from actual decoding information accompanying the encrypted content and end user identifying information;

decoding the encrypted content using the generated decoding key and utilizing of a decrypted content thereof by the end user; and executing accounting to the end user based on a printed page unit that is calculated using at least a printed number, number of pages printed on one sheet, contents total page number and points per page, and only if said encrypted content is decoded.

2. The contents distribution method according to claim 1, wherein said content includes a document displayed or printed in the page unit.

3. A contents distribution system that distributes digitized contents to plural end users, comprising:

a distribution device that distributes encrypted contents along with a content related icon and summary information showing a summary of the encrypted contents and list information showing the contents of said encrypted contents, the distribution device further provides decoding information accompanying encrypted contents, each decoding information specific to an end user in the plural end users;

a user terminal that receives encrypted contents distributed by said distribution device, displays summary information only if decoding information accompanies encrypted contents wherein the end user selects, by clicking on the icon and based on review by the end user of the summary information received, at least one encrypted content from the distributed encrypted contents that can be utilized by the end user, generates a decoding key from actual decoding information accompanying the encrypted content and end user identifying information, decodes the encrypted content using the generated decoding key, and generates accounting information based on a printed page unit that is calculated using at least a printed number, number of pages printed on one sheet, contents total page number and points per page, and only if said encrypted content is successfully decoded;

a central station that collects and totalizes the accounting information generated by said user terminal;

said distribution device encrypts contents provided by a contents provider and generates encrypted contents; and wherein the list of information is displayed upon decoding of the encrypted contents by the end user.

4. The contents distribution system according to claim 3, wherein:

said distribution device distributes said encrypted contents by a broadcast.

5. The contents distribution system according to claim 3, wherein:

said user terminal comprises:

a data sink that receives encrypted contents distributed from said distribution device;

a data output part that stores encrypted contents received by said data sink, decodes said stored encrypted contents and generates accounting information according to the quantity of utilized said decoded contents; and a printer that prints contents decoded by said data output part.

6. The contents distribution system according to claim 5, wherein:

said quantity of utilized contents includes the number of pages included in contents printed by said printer.

7. The contents distribution system according to claim 3, wherein:

said user terminal comprises:

a data sink that receives encrypted contents distributed from said distribution device; and a display that stores encrypted contents received by said data sink, decodes and displays said encrypted contents stored and generates accounting information according to the number of pages included in said displayed contents.

* * * * *